United States Patent [19]
Murakami et al.

[11] Patent Number: 5,085,444
[45] Date of Patent: Feb. 4, 1992

[54] DUST SEAL FOR SLIDING TYPE BUSH

[75] Inventors: Takuya Murakami, Atsugi; Toshihiko Kakimoto, Isehara; Shigeki Dake, Masuda; Junzo Ishimaru, Hiratsuka; Yuji Kyoi, Chiba; Masanao Kameda; Nobuyuki Tamura, both of Chiba, all of Japan

[73] Assignees: Nissan Motor Co., Ltd., Yokohama; Keeper Co., Ltd., Tokyo; Kinugawa Rubber Ind. Co., Ltd., Chiba, all of Japan

[21] Appl. No.: 534,319

[22] Filed: Jun. 5, 1990

Related U.S. Application Data

[63] Continuation of Ser. No. 304,078, Jan. 31, 1989, abandoned.

[30] Foreign Application Priority Data

Feb. 12, 1988 [JP] Japan .................. 63-28860

[51] Int. Cl.⁵ .................................................. F16J 9/06
[52] U.S. Cl. .................................. 277/154; 277/152; 277/153; 277/237 A
[58] Field of Search .................... 277/31, 40, 48, 97, 277/134, 159, 160, 237 A, 152, 153, 154, DIG. 4, 35, 38, 95, 36, 37, 39, 40; 384/484–486

[56] References Cited

U.S. PATENT DOCUMENTS

| | | | |
|---|---|---|---|
| 2,736,586 | 2/1956 | Riesing | 277/153 |
| 2,781,208 | 2/1957 | Foss | 277/DIG. 4 |
| 3,214,180 | 10/1965 | Hudson et al. | |
| 3,306,683 | 2/1967 | Deuring | 384/486 |
| 3,396,975 | 8/1968 | Otto | |
| 3,827,703 | 8/1974 | Brink | 277/153 |
| 3,854,733 | 12/1974 | Wilson | 277/82 |
| 4,017,089 | 4/1977 | Kurata et al. | 277/152 |
| 4,134,596 | 11/1979 | Kawai et al. | 277/DIG. 4 |
| 4,252,329 | 2/1981 | Messenger | 277/153 |
| 4,274,641 | 6/1981 | Cather, Jr. | 277/153 |
| 4,449,717 | 5/1984 | Kitawaki et al. | 277/152 |
| 4,560,177 | 12/1985 | Riley, Jr. | 277/35 |
| 4,585,236 | 4/1986 | Simmons et al. | 277/152 |

FOREIGN PATENT DOCUMENTS

| | | |
|---|---|---|
| 711737 | 10/1941 | Fed. Rep. of Germany ...... 277/153 |
| 1947770 | 10/1966 | Fed. Rep. of Germany . |
| 562456 | 7/1944 | United Kingdom ............ 277/153 |
| 764231 | 12/1956 | United Kingdom . |
| 881607 | 11/1961 | United Kingdom ............ 277/153 |
| 2192675 | 1/1988 | United Kingdom . |

Primary Examiner—William A. Cuchlinski, Jr.
Assistant Examiner—Daniel G. DePumpo
Attorney, Agent, or Firm—Foley & Lardner

[57] ABSTRACT

A dust seal for a sliding type bush is interposed between a stationary section and a movable section. The dust seal has a fitting portion fitted to the stationary section, a seal lip portion in sliding contact with the outer circumferential surface of the movable section and a flexible portion interconnecting the fitting portion and the seal lip portion. The dust seal is further provided with an annular projection held in contact with a flange and the outer circumferential surface of the movable section. The seal lip portion is held axially stationarily relative to the movable section.

7 Claims, 2 Drawing Sheets

DUST SEAL FOR SLIDING TYPE BUSH

This application is a continuation of application Ser. No. 07/304,078, filed Jan. 31, 1989 now abandoned.

BACKGROUND OF THE INVENTION

I. Field of the Invention

The present invention relates in general to bushes used for connecting a suspension or the like to a vehicle body and more particularly to a dust seal for a sliding type bush for use in an automotive vehicle or the like.

II. Description of the Prior Art

A sliding type bush has a stationary section fixed to a vehicle body or the like, an axially movable or slidable section and a dust seal interposed between the stationary and movable sections for preventing ingress of dust, water, etc. into the bush.

The prior art sliding type bush has a disadvantage that its dust seal is liable to be damaged within a short period of usage, i.e., cannot function desiredly over a long period of usage. This is because the outer surface portion of the movable section located outside of the dust seal is exposed to the open air, mud, water, etc. and therefore has a possibility of rusting, resulting in axial movement of the movable section which causes the seal lip portion of the dust seal to slide on the rusted surface portion and be damaged thereby.

SUMMARY OF THE INVENTION

In accordance with the present invention, there is provided an improved dust seal for a sliding type bush which comprises a stationary section and a movable section disposed concentrically with the stationary section and movable relative to the stationary section. The movable section has a flange for limiting axial movement thereof.

The bush further comprises a dust seal interposed between the stationary section and the movable section for providing a seal therebetween.

The dust seal has a fitting portion fitted to the stationary section, a seal lip portion in sliding contact with an outer circumferential surface of the movable section and a flexible portion disposed between the fitting portion and the seal lip portion.

The dust seal further has at the joint beween the flexible portion and the seal lip portion an annular projection held in contact with the flange and the outer circumferential surface of the movable section.

This structure is effective for solving the above noted problems.

It is accordingly an object of the present invention to provide an improved dust seal for a sliding type bush which can function properly or desiredly over a long period of usage.

It is a further object of the present invention to provide an improved dust seal of the above described character which can effect an improved sealing action.

It is a further object of the present invention to provide an improved dust seal of the above described character which can function assuredly even when wear of the dust seal occurs to some extent.

DESCRIPTION OF THE PREFERRED EMBODIMENT

Figure 2:
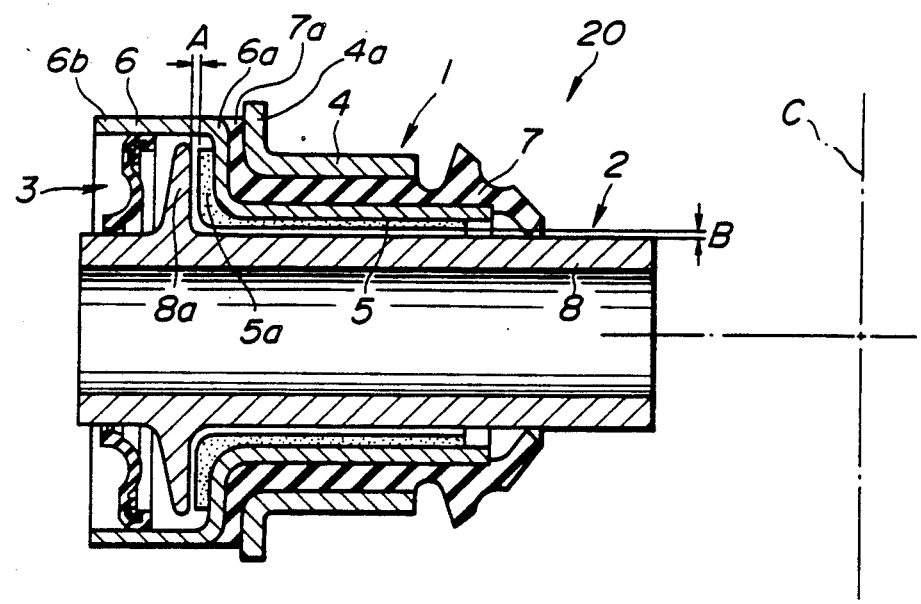
FIG. 2 is a sectional view of a sliding type bush which has been proposed by Japanese patent application 62-70496 which is not a prior art but a so-called internal prior art.
Figure 3:
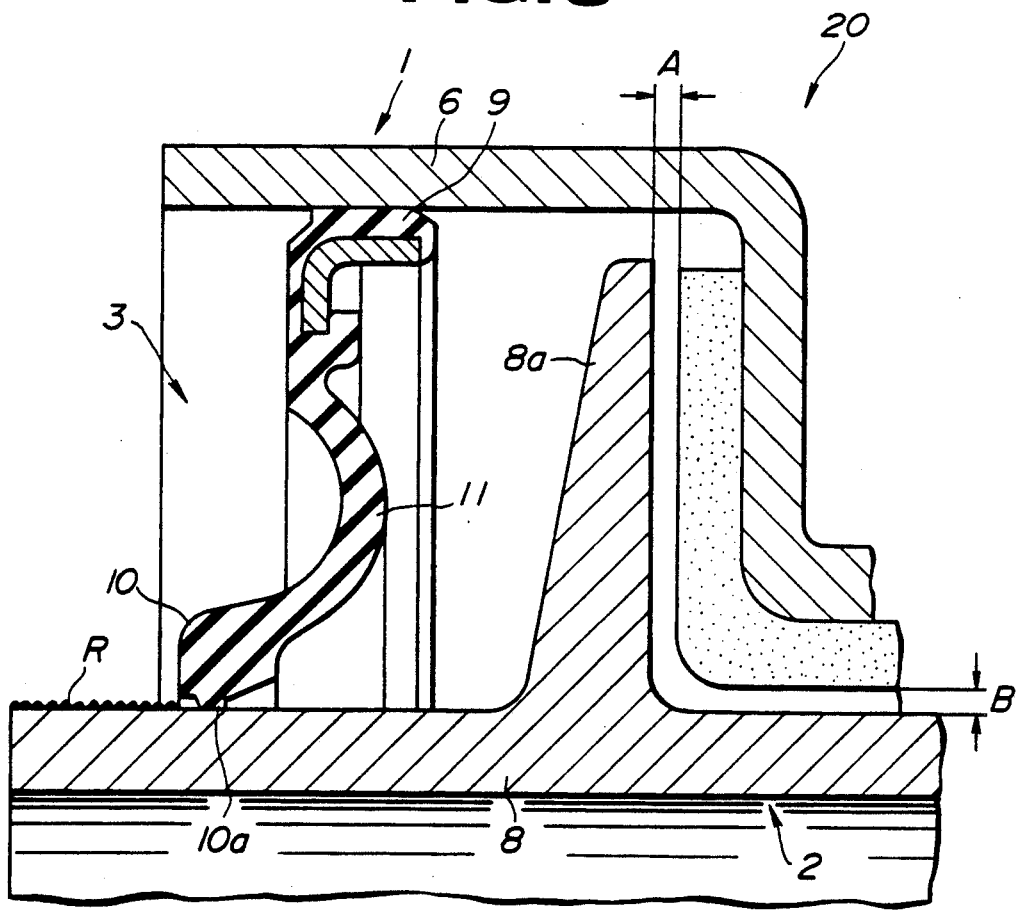
FIG. 3 is a fragmentary enlarged sectional view of a dust seal and its adjacent parts utilized in the sliding type bush of FIG. 2.

Referring to FIGS. 2 and 3, description is first made to a sliding type bush 20 proposed by Japanese patent application 62-70496 which, however, is not a prior art but a so-called internal prior art, in order to facilitate understanding of this invention.

The sliding type bush 20 is shown as comprising an annular stationary section 1, annular movable section 2 concentric with the stationary section 1 and an annular dust seal 3 interposed between the stationary section 1 and the movable section 2. The movable section 2 is axially movable or slidable relative to the stationary section 1 though limitedly. The dust seal 3 is located at an outer end of the dust.

Though not shown, another structural portion identical with what is shown in FIG. 2 is in effect disposed symmetrically with respect to the axis "C" so that two dust seals 3 are located on the opposite axial ends of the bush 20.

The stationary section 1 consists of four concentric tublar members, i.e., an outer tube 4, an annular lining 5, an intermediate tube 6 and an annular elastic member 7. The lining 5 is fitted in the intermediate tube 6. The movable section 2 is received in or passes through the lining 5 in such a way as to be slidable on the inner circumferential surface of the lining 5. The outer tube 4 is disposed around the intermediate tube 6 and the lining 5. The elastic member 7 is interposed between the outer tube 4 and the intermediate tube 6 to absorb shocks applied thereto. The intermediate tube 6 is stepped to have and outward flange 6a and an enlarged diameter otter end portion 6b at the outer end of the flange 6b. The outer tube 4 and the lining 5 have at the outer ends thereof outward flanges 4a and 5a which are located on the opposite sides of the flange 6a. The elastic member 7 has at an outer end thereof an outward flange 7a interposed between the flanges 4a and 5a of the outer tube 4 and the lining 5.

The movable section 2 consists of an inner tube 8 for attaching the bush 20 to a suspension (not shown) or the like by way of a mounting bracket, bolts, etc. The inner tube 8 has adjacent to an end thereof an outward flange 8a which is recieved within the enlarged diameter outer end portion 6b of the intermediate tube 6 and operative to abut upon the outward flange 5a of the lining 5 to limit axial movement of the inner tube relative to the movable section 1.

Apart from the above description, connections may oppositely be made so that the outer tube 4 side serves as a movable section and the inner tube 8 side serves as a stationary section.

The dust seal 3 has a fitting portion 9 fitted in the stationary section 1, a seal lip portion 10 in sliding contact with the movable section 2 and a flexible portion 11 operative to allow relative movement (i.e.,relative axial movement, relative radial movement or oscilation and relative rotation) between the stationary section 1 and movable section 2.

With the above described construction and arrangement, the dust seal 3 is operative to prevent ingress of dust, mud, water, etc. into the bush and egress of grease for the grease clearance A, B out of the bush 20 while allowing relative movement between the stationary section 1 and the movable section 2.

In the sliding type bush 20, the outer circumferential surface portion of the inner tube 8 located outside of the seal lip portion 10 is exposed to the open air, mud, water, etc. and has a possibility of being covered with rust "R". Since the seal lip portion 10 is axially movable or slidable relative to the inner tube 8, axial movement of the inner tube 8 by the grease clearace "A" causes the edge 10a of the seal lip portion 10 to slide on the inner tube 8 axially thereof and ride on or engage the rusted surface portion, thus causing the seal lip portion 10 to be damaged, i.e., wear out rapidly and therefore making it impossible for the dust seal 3 to function properly or desiredly over a long period of usage.

This invention aims at solving the above problems.

Figure 1:
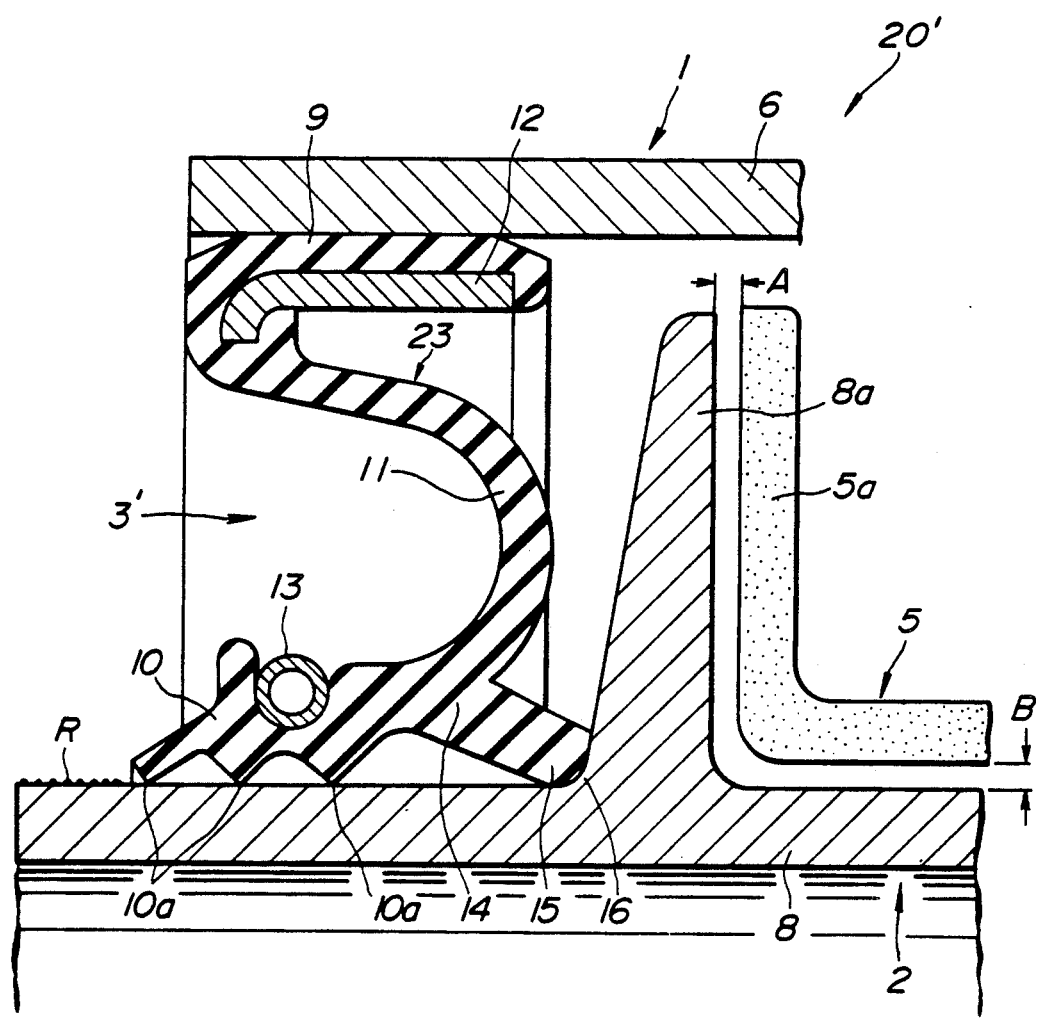
FIG. 1 is a view similar to FIG. 3 but showing a dust seal for a sliding type bush according to an embodiment, of the present invention.

Referring to FIG. 1 in which like or corresponding parts and portions to those of the bush 20 in FIGS. 2 and 3 are designated by the same characters, a dust seal 3' for a sliding type bush 20' according to an embodiment of this invention includes a one-piece annular main body 23 made of rubber. The main body 23 includes a fitting portion 9 fitted in the stationary section 1, a seal lip portion 10 in sliding contact with the movable section 2 and a flexible portion 11 for allowing relative movement between the stationary section 1 and the movable section 2.

The dust seal 3' further includes an outer peripheral ring 12 embedded in the fitting portion 9 in such a way as to extend parallely along the outer periphery of the fitting portion 9 so that the fitting portion 9 is urged by the peripheral ring 12 against the inner circumferential surface of the enlarged diameter outer end portion 6b of the intermediate tube 6 and thereby fixed to the intermediate tube 6.

The flexible portion 11 extends radially and axially inwardly from an outer axial end of the fitting portion 9 and is merged at the inner peripheral end into the seal lip portion 10 so as to allow relative movement between the stationary section 1 and the movable section 2. The seal lip portion 10 is axially waved to have three sealing edges 10a in contact with the outer periphery of the inner tube 8 to effect a sealing action. The dust seal 3' further includes a garter spring 13 fitted in the seal portion 10 so that the sealing edges 10a are urged by the garter spring 13 against the outer circumferential surface of the inner tube 8.

The main body 23 further has an annular projection 15 at the joint 14 between the flexible portion 11 and the seal lip portion 10. The annular projection 15 projects axially and radially inwardly of the bush 23 to have an annular free end urged and held in contact with the joint 16 between the flange 8a and the outer circumferential surface of the inner tube 8, i.e., the annular rubber projection 15 is so designed as to be held at the free end in contact with the flange 8a under the bias of the flexible portion 23 even if the inner tube 8 constituting the movable section 2 moves relative to the dust seal 3 by the grease clearance "A" in the axial direction thereof.

From the foregoing, it will be understood that axial movment of the inner tube 8 by the grease clearance "A" causes the seal lip portion 10 to move correspondingly, thus allowing the sealing edges 10a to contact the outer circumferential surface of the inner tube 8 at axially stationary positions thereof, i.e., the sealing edges 10a moves with the inner tube 8 while being held axially stationarily relative to the outer circumferential surface of the inner tube 8. By this, it becomes possible to prevent the sealing edges 10a from riding on or engaging the outer circumferential portion of the inner tube 8 which is exposed to the open air, mud, water, etc. and covered with rust "R" and therefore it becomes possible to prevent the sealing edges 10a from being damaged by the rusted outer circumferential portion.

It will be further understood that since the projection 15 is adapted to contact not only the flange 8a but the outer circumferential surface of the inner tube 8, it becomes possible to hold the annular projection 15 in good contact with the inner tube 8 even when axial movement of the inner tube 8 occurs.

It will be further understood that the annular projection 15 is effective for maintaining the seal lip portion 10 in a good posture relative to the inner tube 8, i.e., effective for maintaining the relative positions of the seal lip portion 10 and the outer circumferential surface of the inner tube 8 substantially unchanged thereby maintaining a good sealing function even when axial movement of the sealing lip portion 10 becomes large due to the grease clearance "B".

It will be further understood that even when wear of projection 15 occurs, the sealing lip portin 10 is caused to move toward the flange 8a, i.e., toward the outer circumferential surface portion of the inner tube 8 which is not rusted, thus making it possible to prevent accelerated wear of the seal lip portion 10 due to wear of the annular projection 15 and therefore making it possible to maintain the desired sealing function of the dust seal over a long period of usage.

What is claimed is:

1. A sliding type bush comprising:
   concentric inner and outer sections movable relative to each other; and
   a dust seal for providing a seal between said inner and outer sections;
   said inner section having a flange abuttingly engageable with said outer section for limiting movement of said inner section relative to said outer section;
   said dust seal having a fitting portion fitted in said outer section, an annular seal lip portion in sliding contact with an outer circumferential surface of said inner section and an annular flexible portion interconnecting said fitting portion and said seal lip portion;
   said dust seal further having on an inner side thereof and at a junction between said flexible portion and said seal lip portion an annular projection for contact with said flange and said outer circumferential surface of said inner section; and
   said fitting portion having an outer end located more remotely from said flange than an inner end, and said seal lip portion having an inner end located nearer to said flange than an outer end, said flexible portion extending curvedly between said outer end of said fitting portion and said inner end of said seal lip portion for allowing axial movement of said inner section relative to said outer section while holding said annular projection in contact with said flange and said outer circumferential surface of said inner section under a bias of said flexible portion.

2. The sliding type bush according to claim 1 further comprising a garter spring placed around said seal lip portion for urging said seal lip portion against said outer circumferential surface of said inner section.

3. The sliding type bush according to claim 2 wherein said seal lip portion has an inner circumferential surface which is waved to form a plurality of sealing edges which are held axially stationary relative to said outer circumferential surface of said movable section.

4. The sliding type bush according to claim 3 further comprising an outer peripheral ring embedded in said fitting portion for urging said fitting portion against said stationary section.

5. The sliding bush according to claim 1, wherein said flexible portion is generally "S" shaped.

6. A sliding type bush comprising:
an outer stationary section;
an inner movable section disposed concentrically with said stationary section and movable relative to said stationary section;
a dust seal for providing a seal between said stationary and movable sections;
means for limiting axial movement of said movable section relative to said stationary section, said axial movement limiting means including a radially outward extending flange of said movable section and a radially inward extending flange of said stationary section for abutment upon each other;
said dust seal having a fitting portion fitted in said stationary section, an annular seal lip portion in sliding contact with an outer circumferential surface of said movable section and an annular flexible portion interconnecting said fitting portion and said seal lip portion;
said dust seal further having at a junction between said flexible portion and said seal lip portion an annular projection for contact with said radially outward extending flange and said outer circumferential surface of said movable section; and
said fitting portion having an outer end located more remotely from said radially outward extending flange than an inner end, and said seal lip portion having an inner end located nearer to said flange than an outer end, said flexible portion extending curvedly between said outer end of said fitting portion and said inner end of said seal lip portion for allowing axial movement of said movable section relative to said stationary section while holding said annular projection in contact with said radially outward extending flange and said outer circumferential surface of said movable section under a bias of said flexible portion.

7. A sliding type bush comprising:
an outer stationary section;
an inner movable section disposed concentrically with said stationary section and movable relative to said stationary section;
a dust seal for providing a seal between said stationary and movable sections;
means for limiting axial movement of said movable section relative to said stationary section, said axial movement limiting means including a radially outward extending flange of said movable section and a radially inward extending flange of said stationary section for abutment upon each other;
said dust seal having an annular fitting portion fitted in said stationary section, an annular seal lip portion in sliding contact with an outer circumferential surface of said movable section and an annular flexible portion interconnecting said fitting portion and said seal lip portion;
said dust seal further having at a junction between said flexible portion and said lip portion an annular projection for contact with said radially outward extending flange and said outer circumferential surface of said movable section;
said fitting portion having an outer end located more remote from said radially outward extending flange than an inner end, and said seal lip portion having an inner end located nearer to said radially outward extending flange than an outer end, said flexible portion extending curvedly between said outer end of said fitting portion and said inner end of said seal lip portion for allowing axial movement of said movable section relative to said stationary section while holding said annular projection in contact with said radially outward extending flange and said outer circumferential surface of said movable section under a bias of said flexible portion; and
said dust seal further having an outer peripheral ring for fixing said fitting portion to said stationary section, said outer peripheral ring axially extending generally in parallel to an inner periphery of said fitting portion to have opposite axial ends, one of which terminates at a junction between said outer end of said fitting portion and said flexible portion, and the other of which terminates at said inner end of said fitting portion.

* * * * *